Feb. 24, 1931. W. E. DEAN 1,793,593
FLUID PRESSURE BRAKE
Filed Dec. 21, 1928
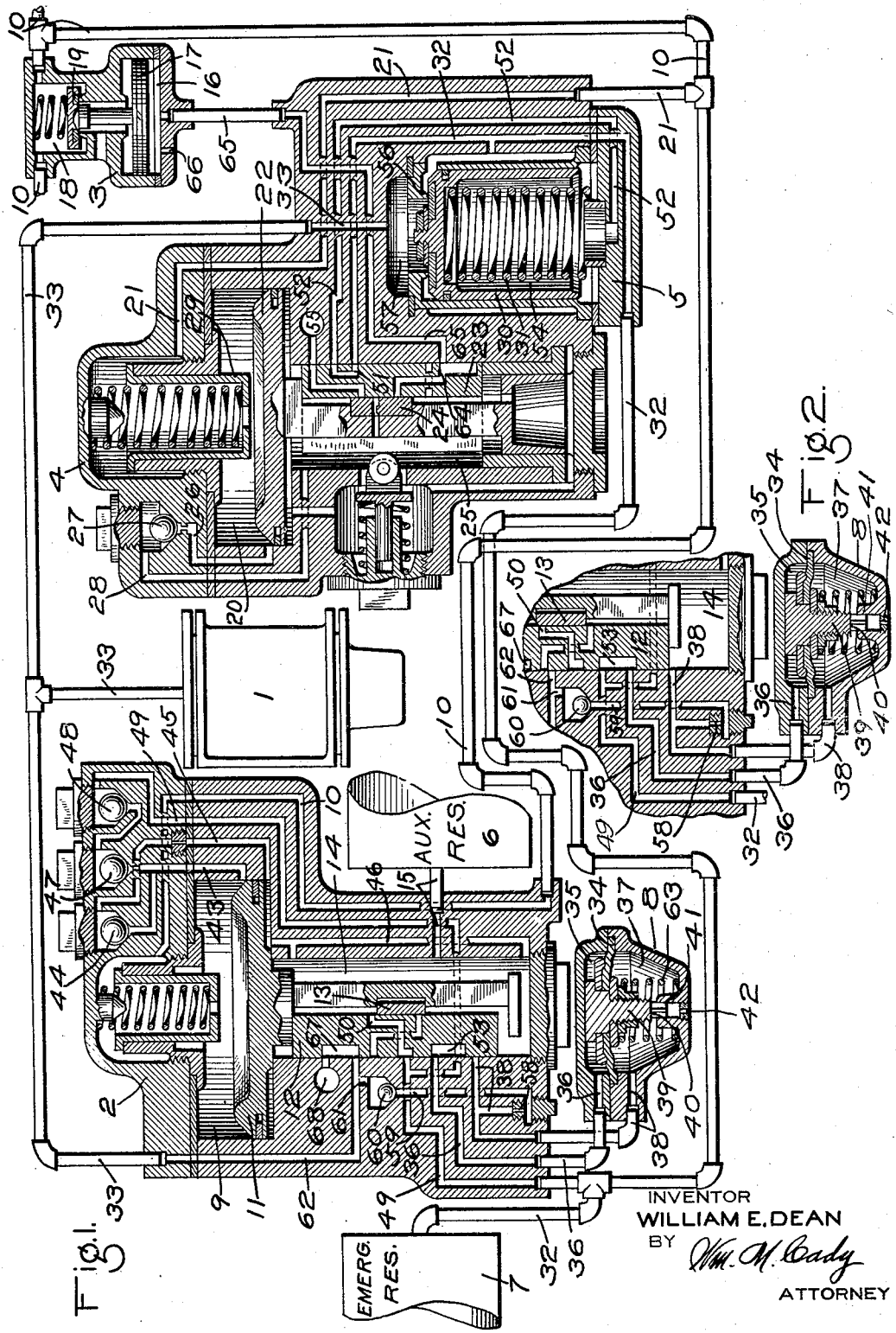

Patented Feb. 24, 1931

1,793,593

UNITED STATES PATENT OFFICE

WILLIAM E. DEAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed December 21, 1928. Serial No. 327,658.

This invention relates to fluid pressure brakes, and has for its principal object the provision of novel means for facilitating the release of the brakes after an emergency application.

Another object of my invention is to provide a fluid pressure brake equipment having means whereby the pressure of fluid in the auxiliary reservoir is caused to be reduced a predetermined degree below the normal equalization point of the emergency reservoir, brake cylinder, and auxiliary reservoir when an emergency application of the brakes is effected, thus rendering the equipment more responsive to an increase in brake pipe pressure in releasing the brakes after an emergency application.

Other objects and advantages will appear in the following more detailed description of the invention.

In the accompanying drawing; Figure 1 is a diagrammatic view, mainly in section, of a fluid pressure brake equipment embodying my invention; and Fig. 2 is a fragmentary sectional view showing a portion of the equipment in emergency position.

As shown in the drawing, the equipment may comprise a brake cylinder 1, a service application valve device 2, a vent valve device 3, an emergency valve device 4, a high pressure valve device 5, an auxiliary reservoir 6, an emergency reservoir 7, and an emergency release valve device 8.

The service application valve device 2 may comprise a casing having a piston chamber 9 connected to a brake pipe 10 and containing a piston 11, a main slide valve 12 and an auxiliary slide valve 13 operable by the piston 11 and contained in a valve chamber 14, which is connected to the auxiliary reservoir 6 through a passage and pipe 15.

The vent valve device 3 may comprise a casing having a piston chamber 16 containing a quick action piston 17, and also having a valve chamber 18 containing a poppet valve 19 operatively connected to the piston 17, said chamber 18 being open to the brake pipe 10.

The emergency valve device 4 may comprise a casing having a piston chamber 20, connected to the brake pipe 10 through pipe and passage 21, and containing a piston 22, which is adapted to operate a main slide valve 23 and an auxiliary slide valve 24 contained in a valve chamber 25 connected to the piston chamber 20 through a restricted passage 26, past a ball check valve 27 and a passage 28. A spring pressed stop 29 is provided in the casing and functions to define the service position of the piston 22.

The high pressure valve device 5 may comprise a valve piston 30, subject on one side to the pressure of a coil spring 31, on the outer seated area of the opposite side, to the pressure of fluid in the emergency reservoir 7 as supplied through a pipe and passage 32, and on the inner seated area to the pressure of fluid in the brake cylinder 1 as supplied through a pipe and passage 33.

The emergency release valve device 8 may comprise a casing in which there is mounted a flexible diaphragm 34, the chamber 35, at one side thereof leading to the seat of the slide valve 12 through a pipe and passage 36, and the chamber 37 at the other side of the diaphragm also leading to the seat of the slide valve 12 through a pipe and passages 38. Contained in the chamber 37 and attached to the diaphragm 34, is a stem 39 having a valve 40 which is adapted to seat on a seat ring 41 and is adapted to be operated by the diaphragm to control the opening and closing of a passage 42 leading from the chamber 37 to atmosphere, which passage 42 is preferably restricted.

In operation, fluid under pressure from the brake pipe 10 flows to the piston chamber 9 of the service application valve device 2, forcing the piston 11 to its innermost position as shown in the drawing. From the piston chamber 9 fluid under pressure flows to the valve chamber 14 through a passage 43, past a ball check valve 44 and a restricted passage 45 as well as through a passage 46 and from the valve chamber 14 to the auxiliary reservoir 6 through passage and pipe 15, charging the reservoir.

Fluid under pressure flowing through the passage 43 also flows past the ball check valves 47 and 48 and through passage 49 and pipe 32 to the emergency reservoir 7, thus charging this reservoir. Fluid under pressure supplied to the valve chamber 14 will also be supplied to the emergency reservoir 7 through a port 50 in the main slide valve 12, passage 49 and pipe 32.

From the brake pipe 10 fluid under pressure flows to the piston chamber 20 in the emergency valve device through pipe and passage 21, forcing the piston 22 to its lowermost position, as shown in the drawing. From the piston chamber 20 fluid flows to the valve chamber 25 through the restricted passage 26, past the ball check valve 27 and passage 28.

From the passage 32 fluid under pressure flows to the outer seated area of the valve piston 30 and from this passage also flows to the opposite side of the valve piston through a cavity 51 in the main slide valve 23 of the emergency valve device 4 and passage 52.

It will be noted, that in initially charging the equipment, the slide valve 12 of the valve device 2, prevents the flow of fluid to the diaphragm chamber 35 of the emergency release valve device 8, and due to this, the pressure of a spring 63 contained in the diaphragm chamber 37, acting on the underside of the diaphragm 34, maintains the valve 40 unseated, as shown in Fig. 1.

With the equipment thus charged, a sudden reduction in brake pipe pressure will effect an emergency application of the brakes.

Upon the sudden reduction of the pressure of fluid in the brake pipe, the pressure of fluid in the piston chambers 9 and 20 of the service application valve device 2 and emergency valve device 4, respectively, will also be reduced, so that the pistons 11 and 22 will be operated to their uppermost or emergency positions, carrying with them their respective slide valves.

With the slide valve 12 of the application valve device 2 in emergency position, fluid under pressure from the emergency reservoir 7 is supplied to the diaphragm chamber 35 of the emergency release valve device 8 through pipe 32, passage 49, a cavity 53 in the slide valve 12, and passages and pipe 36. In this position of the slide valve 12 the passage 38 is uncovered, so that fluid under pressure from the valve chamber 14 flows through the passage and pipe 38 to the diaphragm chamber 37 of the valve device 8.

With the emergency slide valve 23 in emergency position, fluid under pressure from the chamber 54 at the under side of the valve piston 30 is vented to the atmosphere through passage 52, cavity 51 in the slide valve 23 and a passage 55 leading to atmosphere. With the chamber 54 thus vented, pressure of fluid from the emergency reservoir, acting on the outer seated area of the valve piston 30, causes said valve piston to move downward, against the pressure of the spring 31, unseating the valve piston from its seat ring 56, so that fluid under pressure from the emergency reservoir 7 is permitted to flow to the brake cylinder 1 by way of a chamber 57 and passage and pipe 33.

Fluid under pressure from the auxiliary reservoir 6 will also flow to the brake cylinder 1 by way of pipe and passage 15, valve chamber 14 in the application valve device 2, passage 38, a choke plug 58, passage 59, past a ball check valve 60, passages 61 and 62 and pipe 33.

Since the valve 40 of the emergency valve device 8 is unseated, as hereinbefore described, fluid under pressure supplied from the auxiliary reservoir 6 to the diaphragm chamber 37 will flow to the atmosphere past the unseated valve 40 and through the restricted passage 42.

The equalized pressure in the brake cylinder and in the emergency reservoir is prevented from reducing with the auxiliary reservoir by the ball check valve 60, so that only the pressure in the auxiliary reservoir is reduced by flow through the restricted passage 42 in the valve device 8.

When the auxiliary reservoir pressure has been reduced a predetermined amount, say for instance fifteen pounds below the emergency reservoir or brake cylinder pressure, the pressure of fluid in the chamber 35 in the emergency release valve device 8, causes the diaphragm 34 to flex downwardly against the pressure of the spring 63, seating the valve 40 on its seat 41, thus closing off the further flow of fluid from the auxiliary reservoir to atmosphere. It will here be noted that the reduction in auxiliary reservoir pressure is dependent upon the pressure of the spring 63, so that the degree of reduction in auxiliary reservoir pressure may be increased or decreased by the use of a spring having a greater or lesser pressure value.

When the valve 40 of the valve device 8 is thus seated, the ball check valve 60 also prevents the flow of fluid under pressure from the emergency reservoir and brake cylinder to the auxiliary reservoir 6 and prevents the build up in auxiliary reservoir pressure when the application valve device is in emergency position.

With the slide valves 23 and 24 of the emergency valve device 4 in emergency position, fluid under pressure from the valve chamber 25 is vented to the atmosphere through a port 64 in the slide valve 23, passage and pipe 65, piston chamber 16 of the vent valve device 3 and a restricted atmospheric passage 66.

To effect the release of the brakes after an emergency application, the brake pipe pressure is increased in the usual manner, causing the pistons 11 and 22 of the application valve device 2 and emergency valve device 4 respectively to operate to their release positions, carrying with them their respective slide valves. With the slide valve 12 of the application valve device 2 in release position, fluid under pressure from the brake cylinder 1 is vented to the atmosphere by way of pipe 33, passage 62, a cavity 67 in the slide valve 12, and an atmospheric passage 68.

Since the application slide valve 12, in release position, closes off the passage 36, the pressure of fluid in the diaphragm chamber 35 of the emergency valve device may be maintained so that the valve 40 will be held seated against the pressure of the spring 63. Should the valve 40 be seated and the application slide valve 12 be operated to emergency position, the diaphragm will flex upwardly and unseat the valve 40 when the pressure of the spring 63 together with the pressure of fluid in the chamber 37 acting on the underside of the diaphagm, is sufficient to overcome the pressure of fluid in the diaphragm chamber 35 acting on the upper side of the diaphragm. With the valve 40 thus unseated, fluid under pressure from the auxiliary reservoir will be discharged to the atmosphere through the restricted passage 42. The valve 40 will again be seated when the auxiliary reservoir pressure has been reduced the desired amount, in the same manner as hereinbefore described.

It will be noted that, since the auxiliary reservoir pressure is reduced below the equalized pressure of the emergency reservoir and brake cylinder in effecting an emergency application of the brakes, the increase in brake pipe pressure necessary to operate the application valve device 2 to release position will be considerably less than would be required if the pressures in the emergency and auxiliary reservoirs and brake cylinder were permitted to equalize and the equalized pressure maintained in the auxiliary reservoir or would be required if the auxiliary reservoir pressure were permitted to equalize into the brake cylinder and the equalized pressure maintained in the auxiliary reservoir, thus facilitating the release of the brakes. This feature is especially desirable on long trains where, following an emergency application of the brakes, the increase in brake pipe pressure is effected slowly.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with valve means subject to opposing fluid pressures for controlling the brakes and operative upon a sudden reduction in one of said pressures for effecting an emergency application of the brakes, and means operative upon the operation of said valve means to emergency position for reducing the other of said pressures, without affecting the emergency application which has been effected to facilitate the release of the brakes after an emergency application of the brakes.

2. In a fluid pressure brake, the combination with a valve device having a piston subject on opposite sides to opposing fluid pressures and operative to emergency position upon a sudden reduction in the pressure of fluid on one side of said piston in effecting an emergency application of the brakes, and means operative, when said valve device is in emergency position, to reduce the pressure of fluid on the other side of said piston, without affecting the emergency application for facilitating the release of the brakes after an emergency application of the brakes.

3. In a fluid pressure brake, the combination with a brake pipe, auxiliary reservoir and valve means operative upon a sudden reduction in brake pipe pressure for effecting an emergency application of the brakes, of means operative upon the effecting of an emergency application of the brakes for reducing the pressure of fluid in said auxiliary reservoir without affecting the emergency application.

4. In a fluid pressure brake, the combination with a brake pipe, auxiliary reservoir and valve means operative upon a sudden reduction in brake pipe pressure for effecting an emergency application of the brakes, of pressure sensitive means operative upon the effecting of an emergency application of the brakes for reducing the pressure of fluid in said auxiliary reservoir without affecting the emergency application.

5. In a fluid pressure brake, the combination with a brake pipe, auxiliary reservoir and valve means operative upon a sudden reduction in brake pipe pressure for effecting an emergency application of the brakes, of means controlled by the operation of said valve means for reducing the pressure of fluid in said auxiliary reservoir when an emergency application of the brakes is effected without affecting the emergency application.

6. In a fluid pressure brake, the combination with a brake pipe, auxiliary reservoir and valve means operative upon a sudden reduction in brake pipe pressure for effecting an emergency application of the brakes, of a valve device operative upon the effecting of an emergency application of the brakes for venting fluid under pressure from said auxiliary reservoir without affecting the emergency application.

7. In a fluid pressure brake, the combination with a brake pipe, a brake cylinder, an emergency reservoir, an auxiliary reservoir, and valve means operative upon a sudden reduction in brake pipe pressure for supplying fluid under pressure from said emergency reservoir to said brake cylinder to effect an emergency application of the brakes, of means operative when an emergency application of the brakes is effected for venting fluid under pressure from said auxiliary reservoir without decreasing the pressure of fluid in the brake cylinder.

8. In a fluid pressure brake, the combination with a brake pipe, a brake cylinder, an emergency reservoir, an auxiliary reservoir, and valve means operative upon a sudden reduction in brake pipe pressure for supplying fluid under pressure from said emergency reservoir to said brake cylinder to effect an emergency application of the brakes, of means operative when an emergency application of the brakes is effected for reducing the pressure of fluid in said auxiliary reservoir a predetermined amount below the equalized pressure of fluid in said brake cylinder and emergency reservoir when an emergency application of the brakes is effected.

9. In a fluid pressure brake, the combination with a brake pipe, a brake cylinder, an emergency reservoir, an auxiliary reservoir, valve means operative upon a sudden reduction in brake pipe pressure for supplying fluid under pressure from said emergency reservoir to said brake cylinder to effect an emergency application of the brakes, of means operative when an emergency application of the brakes is effected for reducing the pressure of fluid in said auxiliary reservoir a predetermined amount below the equalized pressure of fluid in said brake cylinder and emergency reservior when an emergency application of the brakes is effected, and means for preventing the flow of fluid from said emergency reservoir and brake cylinder to said auxiliary reservoir when said valve means is in emergency position.

10. In a fluid pressure brake, the combination with a brake pipe, an auxiliary reservior charged with fluid under pressure, and a brake cylinder, of valve means subject to the opposing pressures of the brake pipe and auxiliary reservoir and operative upon a sudden reduction in brake pipe pressure for supplying fluid under pressure to the brake cylinder to effect an emergency application of the brakes, and means operative when said valve means is in emergency position for reducing the pressure of fluid in said auxiliary reservoir a predetermined amount below the pressure of fluid in the brake cylinder.

11. In a fluid pressure brake, the combination with a brake pipe, an auxiliary reservoir charged with fluid under pressure, and a brake cylinder, of an additional source of fluid under pressure, valve means operative upon a sudden reduction in brake pipe pressure for supplying fluid under pressure from said auxiliary reservoir and said additional source to the brake cylinder to effect an emergency application of the brakes, and means operative when said valve means is in emergency position for reducing the pressure of fluid in the auxiliary reservoir a predetermined amount below the pressure of fluid in the brake cylinder.

12. In a fluid pressure brake, the combination with a brake pipe, an auxiliary reservoir charged with fluid under pressure, and a brake cylinder, of an additional source of fluid under pressure, valve means operative upon a sudden reduction in brake pipe pressure for supplying fluid under pressure from said auxiliary reservoir and said additional source to the brake cylinder to effect an emergency application of the brakes, and pressure sensitive means operative when said valve means is in emergency position for reducing the pressure of fluid in the auxiliary reservoir a predetermined amount below the pressure of fluid in the brake cylinder.

13. In a fluid pressure brake, the combination with a brake pipe, an auxiliary reservoir charged with fluid under pressure, and a brake cylinder, of an additional source of fluid under pressure, a valve means operative upon a sudden reduction in brake pipe pressure for supplying fluid under pressure from said auxiliary reservoir and said additional source to the brake cylinder to effect an emergency application of the brakes, and means for discharging fluid under pressure from the auxiliary reservoir to the atmosphere when said valve means is in emergency position and operative to close off the discharge of fluid under pressure from the auxiliary reservoir when the pressure of fluid in said auxiliary reservoir is reduced a predetermined amount below the pressure of fluid in the brake cylinder and said additional source.

14. In a fluid pressure brake, the combination with a brake pipe, an auxiliary reservoir charged with fluid under pressure, and a brake cylinder, of an additional source of fluid under pressure, valve means operative upon a sudden reduction in brake pipe pressure for supplying fluid under pressure from said auxiliary reservoir and said additional source to the brake cylinder to effect an emergency application of the brakes, means operative when said valve means is in emergency position for reducing the pressure of fluid in said auxiliary reservoir a predetermined amount below the pressure of fluid in the brake cylinder, and means for preventing the back flow of fluid under pressure from the brake cylinder to said auxiliary reservoir.

15. In a fluid pressure brake, the combination with a brake pipe, an auxiliary reservoir charged with fluid under pressure, and a brake cylinder, of an additional source of fluid under pressure, valve means operative upon a sudden reduction in brake pipe pressure for supplying fluid under pressure from said auxiliary reservoir and said additional source to the brake cylinder to effect an emergency application of the brakes, means operative when said valve means is in emergency position for reducing the pressure of fluid in said auxiliary reservoir a predetermined amount below the pressure of fluid in the brake cylinder, and a check valve for preventing the back flow of fluid from the brake cylinder to said auxiliary reservoir and means.

16. In a fluid pressure brake, the combination with a brake pipe, an auxiliary reservoir charged with fluid under pressure, and a brake cylinder, of an additional source of fluid under pressure, valve means operative upon a sudden reduction in brake pipe pressure for supplying fluid under pressure from said auxiliary reservoir and said additional source to the brake cylinder to effect an emergency application of the brakes, and means subject to the opposing pressures of the emergency reservoir and auxiliary reservoir when said valve means is in emergency position for reducing the pressure of fluid in said auxiliary reservoir a predetermined amount below the pressure of fluid in said emergency reservoir.

17. In a fluid pressure brake, the combination with a brake pipe, a brake cylinder, an emergency reservoir, an auxiliary reservoir, and valve means operative upon a sudden reduction in brake pipe pressure for supplying fluid under pressure from said emergency reservoir and auxiliary reservoir to said brake cylinder to effect an emergency application of the brakes, of a valve device comprising a movable abutment, a valve operated by said abutment for controlling the venting of fluid from the auxiliary reservoir, a spring tending to open said valve, and means for connecting one side of said abutment with the emergency reservoir and the opposite side with the auxiliary reservoir upon effecting an emergency application of the brakes.

18. In a fluid pressure brake, the combination with a brake pipe, a brake cylinder, an emergency reservoir, an auxiliary reservoir, and valve means operative upon a sudden reduction in brake pipe pressure for supplying fluid under pressure from said emergency reservoir and auxiliary reservoir to the brake cylinder to effect an emergency application of the brakes, of a valve device comprising a movable abutment, a valve operated by said abutment for controlling the venting of fluid from the auxiliary reservoir, a spring tending to open said valve, and a valve device subject to the opposing pressures of the auxiliary reservoir and brake pipe operated upon a sudden reduction in brake pipe pressure to connect one side of said abutment with the emergency reservoir and the opposite side with the auxiliary reservoir.

19. In a fluid pressure brake, the combination with a brake pipe, a brake cylinder, an emergency reservoir, an auxiliary reservoir, and valve means operative upon a sudden reduction in brake pipe pressure for supplying fluid under pressure from said emergency reservoir and auxiliary reservoir to said brake cylinder to effect an emergency application of the brakes, of a valve device comprising a movable abutment, a valve operated by said abutment for controlling the venting of fluid from the auxiliary reservoir, a spring tending to open said valve, a valve device subject to the opposing pressures of the auxiliary reservoir and brake pipe and operated upon a sudden reduction in brake pipe pressure to connect one side of said abutment with the emergency reservoir and the opposite side with the auxiliary reservoir, and means for preventing back flow of fluid from the brake cylinder to the auxiliary reservoir in effecting an emergency application of the brakes.

20. In a fluid pressure brake, the combination with a brake pipe, a brake cylinder, an emergency reservoir, an auxiliary reservoir, an emergency valve mechanism operated upon a sudden reduction in brake pipe pressure for supplying fluid under pressure from the emergency reservoir to the brake cylinder, and a service valve device operated upon a sudden reduction in brake pipe pressure for supplying fluid under pressure from the auxiliary reservoir to the brake cylinder, of a release valve device comprising a movable abutment, a valve operated by said abutment for controlling the venting of fluid under pressure from the auxiliary reservoir, the service valve device having means adapted in emergency position to supply fluid under pressure from the auxiliary reservoir to one side of said abutment tending to open said valve and to supply fluid under pressure from the emergency reservoir to the other side of said abutment tending to close said valve.

In testimony whereof I have hereunto set my hand, this 18th day of December, 1928.

WILLIAM E. DEAN.